US010118131B2

(12) United States Patent
Salonen et al.

(10) Patent No.: US 10,118,131 B2
(45) Date of Patent: Nov. 6, 2018

(54) METHOD FOR PREVENTING MICROBIAL GROWTH ON A FILTRATION MEMBRANE

(71) Applicant: KEMIRA OYJ, Helsinki (FI)

(72) Inventors: Jussi Salonen, Helsinki (FI); Marko Kolari, Vantaa (FI); Mehrdad Hesampour, Espoo (FI); Kaj Jansson, Tampere (FI)

( * ) Notice: Subject to any disclaimer, the term of this patent is extended or adjusted under 35 U.S.C. 154(b) by 0 days.

(21) Appl. No.: 14/369,727

(22) PCT Filed: Dec. 19, 2012

(86) PCT No.: PCT/FI2012/051278
§ 371 (c)(1),
(2) Date: Jun. 30, 2014

(87) PCT Pub. No.: WO2013/098479
PCT Pub. Date: Jul. 4, 2013

(65) Prior Publication Data
US 2014/0367334 A1 Dec. 18, 2014

(30) Foreign Application Priority Data

Dec. 30, 2011 (EP) .................................. 11196196

(51) Int. Cl.
*B01D 65/02* (2006.01)
*C02F 1/44* (2006.01)
*B01D 65/08* (2006.01)
*B01D 61/02* (2006.01)
(Continued)

(52) U.S. Cl.
CPC ............ *B01D 65/08* (2013.01); *B01D 61/025* (2013.01); *B01D 61/04* (2013.01); *C02F 1/441* (2013.01);
(Continued)

(58) Field of Classification Search
None
See application file for complete search history.

(56) References Cited

U.S. PATENT DOCUMENTS 5,705,050 A * 1/1998 Sampson ............... B01D 61/48
205/687
6,049,002 A * 4/2000 Mattila .................. A01N 37/16
422/12
(Continued)

FOREIGN PATENT DOCUMENTS

JP     2000117069 A  *  4/2000
JP     2005154551 A     6/2005
(Continued)

OTHER PUBLICATIONS

NPL-1 (Title: CAPFIL membrane products) Pub date: Aug. 2003.*
Translation of JP2000117069A.*

*Primary Examiner* — Hayden Brewster
(74) *Attorney, Agent, or Firm* — Berggren LLP

(57) ABSTRACT

The present invention relates to a method for preventing microbial growth on a filtration membrane during desalination process. The method comprises that the membrane is exposed to a low concentration of performic acid by continuously or intermittently introducing performic acid to the membrane surface. When performic acid is added according to the present invention to the water flow, there is no significant reduction in the water flux through the membrane.

7 Claims, 1 Drawing Sheet

(51) Int. Cl.
   *B01D 61/04*    (2006.01)
   *C02F 1/72*    (2006.01)
   *C02F 1/68*    (2006.01)
   *B01D 15/00*    (2006.01)

(52) U.S. Cl.
   CPC .... *B01D 2321/162* (2013.01); *C02F 2303/16* (2013.01)

(56) References Cited

U.S. PATENT DOCUMENTS

| | | | | |
|---|---|---|---|---|
| 6,211,237 | B1* | 4/2001 | Huss | C02F 1/50 514/557 |
| 2005/0112740 | A1* | 5/2005 | Haase | C02F 1/66 435/168 |
| 2006/0196836 | A1* | 9/2006 | Arakel | B01D 61/025 210/723 |
| 2007/0056904 | A1* | 3/2007 | Hogt | B01D 61/04 210/636 |
| 2012/0255898 | A1* | 10/2012 | Buschmann | B01D 67/0006 210/483 |
| 2016/0031809 | A1* | 2/2016 | Kraus | C02F 1/50 514/557 |

FOREIGN PATENT DOCUMENTS

| | | |
|---|---|---|
| WO | 0119414 A1 | 3/2001 |
| WO | 2005005028 A1 | 1/2005 |

* cited by examiner

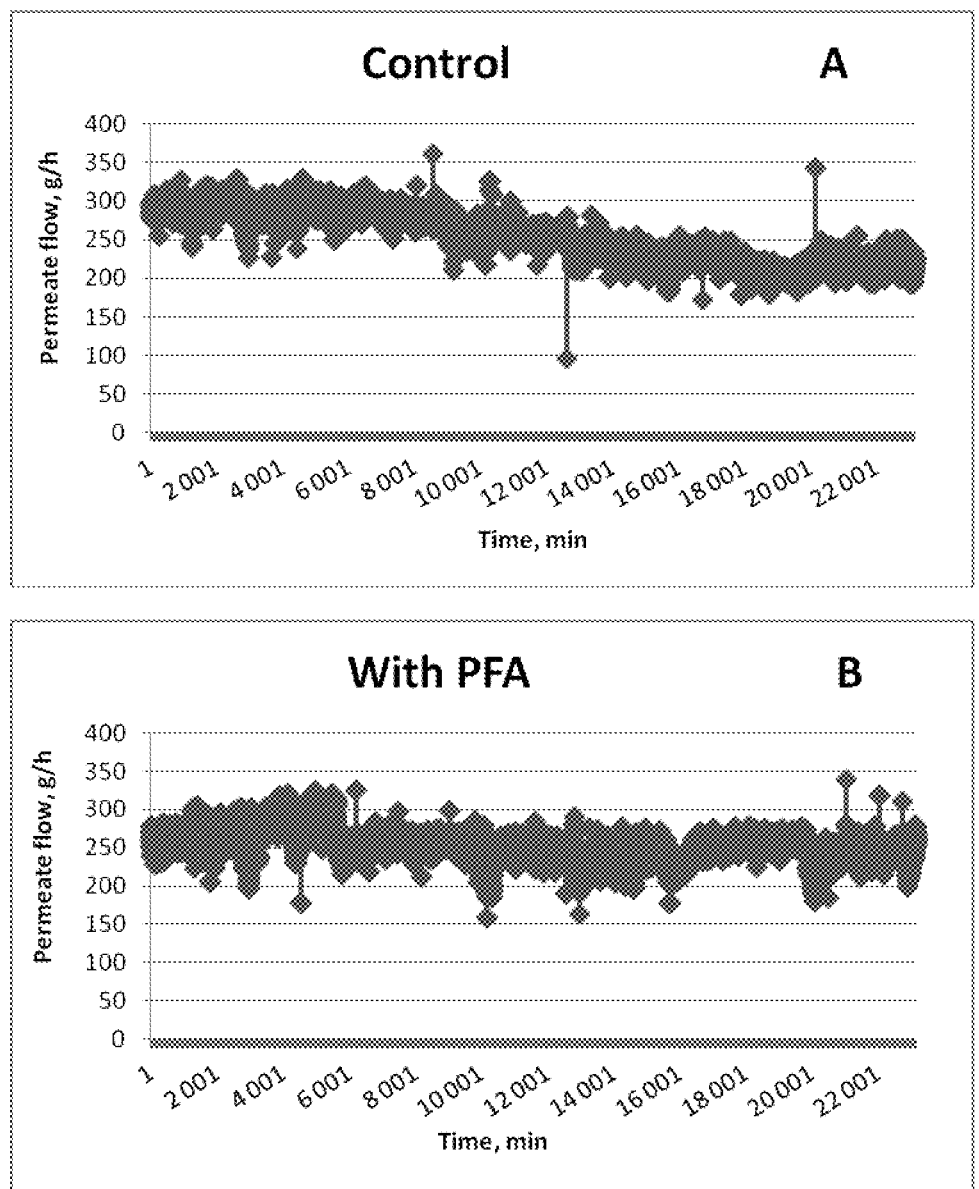

METHOD FOR PREVENTING MICROBIAL GROWTH ON A FILTRATION MEMBRANE

CROSS-REFERENCE TO RELATED APPLICATION

This application is the 35 U.S.C. § 371 national stage of PCT Application No. PCT/FI2012/051278, filed Dec. 19, 2012, which is herein incorporated by reference in its entirety and which also claims priority to, and the benefit of, European Patent Application No. 11196196.7, filed Dec. 30, 2011, which is herein incorporated by reference in its entirety.

The invention relates to a method for preventing microbial growth on filtration membranes and biofouling of membranes during desalination process. The microbial growth on the filtration membranes and biofouling of the membranes is prevented by introducing a low amount of performic acid to the membrane surface. By introducing a low amount of performic acid to the membrane surface there is no significant reduction in the flux.

The salinity of sea water is about 30-50 g/l and brackish water 0.5-30 g/l. In order to make saline water useful for human consumption or irrigation, the water should be desalinated. Desalination refers to several processes that remove at least some amount of salt and other minerals from saline water.

In desalination can be applied several technologies. Commonly applied technologies use membranes and apply reverse osmosis. The membranes may be different types of filtration membranes, such as reverse osmosis membranes or ultra-filtration membranes. A disadvantage in the use of membranes is that during operation, the membranes gradually become fouled.

According to the current practice the desalination system uses oxidizing or non-oxidizing biocides as quick-acting disinfectants in the saline water flow prior to membrane in order to prevent the fouling of the membrane. Typical oxidizing agents are chloric compounds. Said oxidizers must have very strong biosidic effect, since even one living microbe reaching the membrane may cause biofilm formation. A disadvantage of this system is that the oxidizing biocides may damage the membrane, when they come into contact with the membrane surface. Membrane damage is expected to occur in particular, if the membrane is exposed to an oxidizer continuously. In order to avoid the damage of membrane, reductants are usually added to neutralize the oxidizing biocides before they reach the membrane.

The use of oxidizers for membrane cleaning has been suggested in some prior art publications. For example JP2000117069 describes an intermittent cleaning procedure wherein an oxidizing germicide containing peracetic acid, hydrogen peroxide, and acetic acid is incorporated into back-washing water of the filter membrane module, and the back-washing is periodically performed for 0.5-2 minutes every 0.3-2 hours. Membranes can tolerate this kind of short-term exposure that is non-continuous.

Also U.S. 2007/0056904A1 describes a cleaning method using water-soluble organic or inorganic peroxides, e.g. peracids. The publication suggests continuous or intermittent dosing of oxidizers to the influx, or a combination of these techniques. Continuous dosing of oxidizers means that oxidizers are continuously added for a certain short period of time, for example 400 or 1500 seconds as described in the examples of US 2007/0056904A1. The publication suggests that preferably one or more reductants (e.g. bisulfite) are dosed into water influx in order to improve the performance of the peroxide compound. It is to be noted that the use of bisulfite or other reductants is against best practices in desalination processes.

JP 2005154551 describes a sterilizing cleanser composition comprising an organic peracid-containing aqueous solution with a persulfate. The cleanser composition is aimed for sterilizing cleansing medical equipment, water treatment apparatuses and food production machines.

Although various agents preventing microbial growth, such as oxidizers, have been used for membrane cleaning there is still a need for an improved method for the prevention of microbial growth and biofilm formation on membranes.

SUMMARY

One object of the present invention is to provide an improved method for the prevention of microbial growth on membranes and biofouling of membranes. In particular, it is an object of the invention to provide a method, which does not damage the membranes and which continuously keeps the membranes free of microbial growth and biofouling.

In the present invention it has been surprisingly found that when a low amount of performic acid is introduced to membrane surface continuously or intermittently there is no significant reduction in the flux or in the salt rejection.

The inventors have found that amounts effective in disinfection are small in the case of using performic acid and that surprisingly one can let the performic acid (PFA) to flow onto and come into contact with the membrane in a continuous or intermittent manner during operation of the membrane. This finding is giving significant benefits over the prior art where oxidizing biocides are used as disinfectants.

Thus, the present invention provides a method for the prevention of microbial growth on filtration membrane and biofouling of membranes during desalination process. The method comprises that the membrane is exposed to PFA by continuously or intermittently introducing PFA to the membrane surface thereby preventing adherence of microorganisms to the membrane surface and initiation of microbial growth.

When the growth of microorganisms and biofilm formation in desalination plants is controlled by adding performic acid continuously or intermittently for disinfection purposes to water which is contacted with membranes, there is no need to neutralize the oxidizer with a reductant before it reaches the membranes.

More specifically, the method according to the present invention is characterized by what is stated in the characterizing part of claim 1 and use according to the present invention is characterized by what is stated in the characterizing part of claim 5.

The present invention has significant benefits over the prior art. First of all, the reductant that is nowadays practically always used to neutralize the oxidizer is not needed at all. This simplifies the process and reduces the amount of different chemicals required.

Second benefit achieved is that the active agent, PFA, actually reaches the membrane surface and controls biofilm growth at the place where the biofilm bacteria try to adhere and initiate biofilm formation. This is a significant benefit compared to the current practice where the active oxidizing biocide never reaches the place where its main function, i.e. biofilm control, is expected to take place. In contrary, in current practice people need to rely on the quick disinfection done far away from the final target and need to rely that the disinfection will prevent biofilm formation on the membrane surface. The current practice is not as effective as direct control at the point where biofilm tries to emerge.

BRIEF DESCRIPTION OF THE DRAWINGS

FIG. 1 shows a comparison between permeate flux, A: control, B: with PFA addition.

DETAILED DESCRIPTION OF THE INVENTION

It has now been found that an excellent effect is achieved by adding performic acid continuously or intermittently to water flow contacting membrane surface during desalination process.

Thus, according to the invention, a method for the prevention of microbial growth on membranes is provided, wherein the oxidizer does not damage the membrane.

Water to be treated by desalination refers here in particular to saline water which comprises of total dissolved solid from 0.5 to 50 g/l preferably from 1 to 40 g/l.

Performic acid can be added continuously or intermittently to water flow which comes into contact with filtration membrane. It is crucial that the adding is directed to the substantially same water fraction, which subsequently reaches the membrane.

PFA can be added continuously or intermittently at the same time as desalination plant is functioning without interruption, which is a significant advantage. "Continuously introducing performic acid to water flow contacting membrane surface" means that performic acid is added continuously to flowing water which comes into contact with the filtration membrane.

Continuously means at least 12 hours, in some embodiments of at least 18 hours, in some embodiments of at least 24 hours, typically at least one week up to for example 4 weeks, in some embodiments up to 8 weeks depending on the duration of the process. In fact, continuous adding does not have upper time limit; it is interrupted, when the desalination process is interrupted for other reasons.

Although there are no disadvantages of introducing PFA continuously to water flow contacting membrane surface, PFA can be introduced also intermittently.

Intermittently means that there can be breaks in the performic acid addition. For example in some cases where the biological potential for fouling of the membranes is only moderate, an intermittent treatment can be applied, i.e. for the whole time of operating the desalination membrane system the PFA dosing can be cyclically on and off.

The break in performic acid addition can be from 5 seconds to 4 hours, in some embodiments, from 5 minutes to 3 hours, in other embodiments from 10 minutes to 2 hours, typically from 15 minutes to 1 hour. The duration of the break in adding performic acid depends on how high the risk of biofouling is which is effected by for example purity of water and temperature.

Number of the breaks is not limited. The number of the breaks can be one or more. The number of the breaks depends on how high the risk of biofouling is. For example, in cases where the biological potential for fouling of the membranes is low, the number of the breaks can be higher than in the cases where the biological potential for fouling of the membranes is high.

Performic acid is introduced to water flow contacting membrane surface in such an amount that the concentration in water flow contacting membrane surface is in some embodiments 0.1 to 10 mg/l PFA, in other embodiments 0.2 to 5 mg/l. According to a preferred embodiment PFA is added in such an amount that the concentration in water flow contacting membrane surface is 0.4-1 mg/l.

The temperature during the process may be 10 to 40° C., in some embodiments 20 to 25° C.

The term water flux refers here to the flow rate of water through membrane. When the filtration membrane is fouled the flux decreases. When performic acid is added according to the present invention to the water flow, there is no significant reduction in the flux. The change in flux is less than 15%, preferably less than 10%, more preferably less than 5%.

According to one particularly preferred embodiment of the invention performic acid is used as an equilibrium solution. The equilibrium solution can be made by mixing formic acid solution with hydrogen peroxide solution and adding strong acid, for example sulphuric acid as a catalyst.

Performic acid is able to kill efficiently and quickly all kind of biofilm forming microorganisms present in waters, such as aerobic bacteria, facultatively anaerobic bacteria, sulfate reducing bacteria, bacteria forming biofilms, yeasts, moulds, and protozoa, and prevent their growth. PFA is able to kill in particular freely swimming microbes in water. The killing effect is based on the capability of PFA to reach the membrane surface of the target microbes.

The results of the experiments showed clearly that there is no significant reduction in the flux when performic acid is added to water during desalination process. As a consequence costs are reduced, when the desalination process need not be interrupted for filtration membrane cleaning. In addition membranes function reliably and for longer times. The invention will now be described in more detail by means of the following non-limiting examples.

Example 1

Flux and salt rejection of fresh membrane were measured before and after soaking. The membrane was placed in a flat sheet cell (Alfa Laval LabM20). The operating conditions were, feed pressure 20 bar (for sea water membrane 55 bar), salt (synthetic sea water prepared according to ASTM standard D1141), temperature 25° C. The flux measurement was done for 3 hours.

Soaking was done by mixing biocide with synthetic sea water. The concentration of the added biocide in the synthetic sea water was for PFA 14 and 84 mg/l as active substance, for peracetic acid (PAA) 7, 18 and 35 mg/l as active substance and sodium hypochlorite 20 mg/l as active substance. PFA was added to the synthetic seawater as an equilibrium solution having PFA content 14 weight-%, PAA was added as an equilibrium solution having PAA content 35 weight-% and sodium hypochlorite having concentration of 15 weight-%.

The soaking time was 24 or 144 hours. Performic acid equilibrium solution was made by mixing in 1:1 weight proportion of a solution that contained 50% hydrogen peroxide with a solution that contained 75 weight-% formic acid, 12 weight-% sulfuric acid and 13 weight-% water. After soaking membranes were placed again to the flat sheet cell and salt rejection and flux were measured at the same conditions as before soaking.

Flux and salt rejection data before and after soaking are presented in Table 1. It can be seen that for membrane soaked in performic acid the differences between flux before and after soaking are less than 15% while for other membranes (soaked in peracetic and sodium hypochlorite) the differences are bigger than 15%.

TABLE 1

Changes in flux for membrane soaked in performic acid, peracetic acid and hypochlorite.

| Product | mg/l | hour | Initial flux | Flux after soaking |
|---|---|---|---|---|
| Performic acid | 14 | 144 | 86 | 84 |
|  | 84 | 24 | 98 | 95 |
| Peracetic acid | 7 | 144 | 86 | 73 |
|  | 18 | 144 | 91 | 53 |
|  | 35 | 144 | 86 | 44 |
| Hypochlorite | 20 | 144 | 93 | 41 |

Results in Table 1 show that surprisingly performic acid did not damage membranes compared to the commonly used oxidizing biocides sodium hypochlorite or peracetic acid.

Example 2

The impact of PFA on membrane was further studied by a laboratory scale continuous filtration experiment. The type of membrane used in the experiment was brackish water membrane (FilmTec BW30LE).

The continuous filtration has been done in parallel. From a single brackish water tank the water was pumped to two parallel lines with flat sheet cells having similar brackish water membrane. In one line PFA was added continuously into feed and in other line (control) there was no PFA addition. The filtration conditions were as follows: pressure 15 bar, salt (sea salt): 2 g/l, Temperature: 20° C., flow rate: 48 l/h, PFA dosing rate: 6.5 g/h equilibrium solution having PFA active substance concentration 14 weight-% (=19.8 ppm active substance/l of brackish water). Flux and conductivity of permeate and concentrate were monitored and collected over time (for 30 days). The variation of permeate flux with time for both parallel experiments is presented in FIG. 1 and Table 2.

As can been seen in FIG. 1 B where PFA was added, the changes in flux were small while for control line (without PFA) flux decreased over test period. Also, the membrane tolerated the PFA that can be seen from the salt rejection values in Table 2.

TABLE 2

Flux and salt rejection for two parallel filtering lines.

| Parameter/line | Control | With PFA |
|---|---|---|
| Initial permeate flux, g/h | 300 | 250 |
| Final permeate flux, g/h | 200 | 250 |

TABLE 2-continued

Flux and salt rejection for two parallel filtering lines.

| Parameter/line | Control | With PFA |
|---|---|---|
| Initial salt rejection, % | 98 | 98 |
| Final salt rejection, % | 98 | 98 |

The invention claimed is:

1. A method for prevention of microbial growth on a filtration membrane in a desalination system during a desalination process of sea water or brackish water, the method consists of exposing the filtration membrane to performic acid by continuously or intermittently introducing 0.4-1 mg/l performic acid to a sea water or a brackish water flow contacting a membrane surface of the filtration membrane at the same time as the desalination system is functioning without interruption, wherein a water flux through the membrane remains greater than 85% of an original water flux throughout the desalination process.

2. The method according to claim 1, wherein the membrane is exposed to performic acid by continuously introducing performic acid to the sea water or the brackish water flow contacting the membrane surface for at least 12 hours.

3. The method according to claim 1, wherein the sea water comprises total dissolved solid from 30 to 50 g/l and the brackish water comprises total dissolved solid from 0.5 to 30 g/l.

4. A method for prevention of microbial growth on a filtration membrane in a desalination system during a desalination process of sea water or brackish water, the method consists of exposing the filtration membrane to performic acid by continuously or intermittently introducing 0.4-1 mg/l performic acid to a sea water or a brackish water flow contacting a membrane surface of the filtration membrane at the same time as the desalination system is functioning without interruption, wherein a saline water flux through the membrane remains greater than 85% of an original water flux throughout the desalination process, and wherein performic acid does not damage the filtration membrane.

5. The method according to claim 4, wherein the membrane is exposed to performic acid by continuously introducing performic acid to the sea water or the brackish water flow contacting the membrane surface for at least 12 hours.

6. The method according to claim 4, wherein the sea water comprises total dissolved solid from 30 to 50 g/l and the brackish water comprises total dissolved solid from 0.5 to 30 g/l.

7. The method of claim 1, wherein the desalination process is not interrupted for filtration membrane cleaning.

* * * * *